(12) United States Patent
Vogeley, Jr.

(10) Patent No.: US 8,839,949 B2
(45) Date of Patent: Sep. 23, 2014

(54) DETERMINATION AND CORRECTION OF CONVEYOR BELT SPEED/LOCATION

(71) Applicant: John Bean Technologies Corporation, Chicago, IL (US)

(72) Inventor: Arthur W. Vogeley, Jr., Seattle, WA (US)

(73) Assignee: John Bean Technologies Corporation, Chicago, IL (US)

( * ) Notice: Subject to any disclaimer, the term of this patent is extended or adjusted under 35 U.S.C. 154(b) by 0 days.

(21) Appl. No.: 13/837,471

(22) Filed: Mar. 15, 2013

(65) Prior Publication Data

US 2013/0341156 A1 Dec. 26, 2013

Related U.S. Application Data

(60) Provisional application No. 61/624,170, filed on Apr. 13, 2012.

(51) Int. Cl.
| | |
|---|---|
| *B65G 23/00* | (2006.01) |
| *B26F 3/00* | (2006.01) |
| *B65G 43/08* | (2006.01) |
| *B26D 5/00* | (2006.01) |
| B65G 43/00 | (2006.01) |
| B26D 7/06 | (2006.01) |

(52) U.S. Cl.
CPC ............ *B65G 43/08* (2013.01); *B65G 43/00* (2013.01); *B26F 3/004* (2013.01); *B26D 5/007* (2013.01); *B26D 7/0625* (2013.01); *B65G 2207/48* (2013.01)
USPC ..................................... 198/832; 198/810.03

(58) Field of Classification Search
CPC ........... B65G 2203/00; B65G 2203/02; B65G 2203/04; B65G 2203/042; B65G 2203/044
USPC ............... 198/810.03, 832, 832.1, 835, 460.1
See application file for complete search history.

(56) References Cited

U.S. PATENT DOCUMENTS

| | | | |
|---|---|---|---|
| 4,433,777 A | 2/1984 | Densmore | |
| 5,197,915 A * | 3/1993 | Nakamura et al. | ............... 452/51 |
| 7,606,514 B2 * | 10/2009 | Sakai | ....................... 198/810.03 |
| 8,397,896 B2 * | 3/2013 | Kleinikkink et al. | ...... 198/345.3 |
| 2003/0036344 A1 | 2/2003 | Sigurdsson | |
| 2004/0055855 A1 | 3/2004 | Koban | |
| 2008/0245243 A1 | 10/2008 | Rusko | |
| 2009/0120768 A1 | 5/2009 | Kusel | |

OTHER PUBLICATIONS

International Search Report and Written Opinion mailed Jul. 23, 2013, issued in corresponding International Application No. PCT/US2013/036426, filed Apr. 12, 2013, 9 pages.

* cited by examiner

*Primary Examiner* — James R Bidwell
(74) *Attorney, Agent, or Firm* — Christensen O'Connor Johnson Kindness PLLC

(57) ABSTRACT

Sprockets (22) and (42) are engaged with a conveyor belt (18) itself or a chain (28) coupled to the belt. An encoder is used to determine the differential of the rotation of the sprockets. From that information, the instantaneous pitch of the conveyor belt located between the first and second rotational axes can be determined, and from that information the speed of the belt can be determined. This information can be used to control work tools or other devices that act on work products being carried by the conveyor belt.

12 Claims, 5 Drawing Sheets

DETERMINATION AND CORRECTION OF CONVEYOR BELT SPEED/LOCATION

CROSS-REFERENCE TO RELATED APPLICATION

This application claims the benefit of U.S. Provisional Application No. 61/624,170, filed Apr. 13, 2012, the disclosure of which is hereby incorporated by reference herein.

BACKGROUND OF THE INVENTION

Workpieces, including food products, are cut or otherwise portioned into smaller portions by processors in accordance with customer needs. Also, excess fat, bone, and other foreign or undesired materials are routinely trimmed from food products. It is often desirable to portion and/or trim the workpieces into uniform sizes, for example, for steaks to be served at restaurants or chicken fillets used in frozen dinners or in chicken burgers. Much of the portioning/trimming of workpieces, in particular food products, is now carried out with the use of high-speed portioning machines. These machines use various scanning techniques to ascertain the size, weight and shape of the food product as it is being advanced on a moving conveyor. This information is analyzed with the aid of a computer to determine how to most efficiently portion the food product into optimum sizes. For example, a customer may desire chicken breast portions in two different weight sizes, but with no fat or with a limited amount of acceptable fat. The chicken breast is scanned as it moves on an infeed conveyor belt and a determination is made through the use of a computer as to how best to portion and/or trim the chicken breast to the weights desired by, and fat content level acceptable to, the customer, so as to use the chicken breast most effectively.

Portioning machines of the foregoing type are known in the art. Such portioning machines, or components thereof, are disclosed in prior patents, for example, U.S. Pat. Nos. 4,962, 568 and 5,868,056, which are incorporated by reference herein. As typical, the portioning machine includes an infeed conveyor having a moving, solid belt that slides over a support structure. The infeed conveyor belt is driven at a selected speed by a drive motor. The drive motor can be composed of a variable speed motor to thus adjust the speed of the infeed belt. The workpieces are first carried by the infeed conveyor past a scanning station, where the workpieces are scanned, for example by an optical scanner, to ascertain selected physical parameters, for example, their size and shape, and then determine their weight, typically by utilizing an assumed density for the workpieces. In addition, it is possible to locate discontinuities (including voids), foreign material, and undesirable material in or on the workpiece, for example, bones or fat in a meat portion.

The data and information measured/gathered at the scanning station are transmitted to a computer, preferably on board the portioning apparatus, which records the location of the workpiece on the infeed conveyor as well as the shape and other parameters of the workpiece. With this information, the computer determines how to optimally cut, portion and/or trim the workpiece at the portioning station. Once the workpieces are scanned, they may be transferred to a cutting conveyor, typically composed of a metal mesh material. Portioning may be carried out by various types of cutting/portioning devices.

The cutting devices rely on the determined location of the workpiece on the belt at the scanning station to know where to make the cuts determined by the computer. Thus, it is important that the speed of the infeed conveyor and the cutting conveyor 8 be accurately controlled, and ideally both conveyors will operate at the same uniform speed. If the speeds of the conveyor(s) vary, then the actual position of the workpiece relative to the cutting/portioning devices will not correspond to that calculated by the computer.

As noted above, the cut paths are computed from the scan data and product specifications to create the desired portions. The scanning and cutting/portioning stations are typically separated by a distance on the order of 3 meters. In order to achieve the desired cutting result, the transporting of the work product on the cutting conveyor needs to be extremely accurate relative to its predicted position. A position error of even 1 mm of the work product on the conveyor creates an unacceptably inaccurate cut of the work product.

Cutting belts are often driven by sprockets mounted on a drive shaft. The sprocket teeth engage the links of the belt or the links of a chain connected to the belt. The angular position of the belt drive shaft is known from a digital signal provided by an encoder that monitors the angular position of the drive shaft. If the link pitch of the belt was always constant throughout the belt, it would be easy to convert the drive shaft position to belt position. However, the belt pitch is often not very consistent due to manufacturing inaccuracies or wear and damage that occur over time. The metal belt links typically rotate on metal cross rods. See for example links 30 and cross rods 32 in FIG. 3 herein. The fit between the rods and holes in the links is necessarily loose, and as wear occurs, the holes become elongated to form slots, and the pitch of the belt links changes. If some part of the belt gets damaged and is replaced with a new belt, there will be two different pitches of belt within the system. A position error of 1 mm in 3 meters on a belt with a link pitch of 14 mm can be created by wear of only 4.7 microns (1.8 ten thousandths of an inch) per link. As a reference, a roller chain (such as on a bicycle) is generally allowed to wear up to 125 microns per link before replacement; so the assumption of uniform belt pitch on a conveyor belt could cause very large errors in the assumed position of a work piece on the conveyor belt.

One means of overcoming this issue is to measure belt position using an encoded friction roller that rolls against the belt surface. In this regard, see U.S. Pat. No. 7,025,196, which is incorporated by reference herein. The encoder signal can either be used directly to time the cutters or it can be used as feedback to the drive shaft to keep it at a constant speed. There are significant disadvantages to this approach, including difficulties maintaining friction between the friction roller and belt without excessive belt tension and in the presence of contaminants such as chicken, chicken fat, and water on the belt. Wrapping the belt path partially around the encoded friction roll could reduce slippage issues, but does not necessarily eliminate them.

The present disclosure seeks to address the need to accurately and reliably know the location of a workpiece on a conveyor.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A control system for controlling the operation of a work tool on food products or other types of workpieces based on the location of the workpiece relative to the work tool includes a conveyor for carrying the workpiece to the work tool, the conveyor comprising a belt composed of sequential segments. A wheel mounted on a rotational shaft includes protrusions extending from the perimeter of the wheel to engage the belt segments. The location of the workpiece relative to the work tool can be determined by the angular position of the rotational axle shaft and the instantaneous pitch of the belt segments at the rotational axle shaft. In a further aspect of the present disclosure, a second wheel is mounted on a second rotational axle at a location spaced apart along the conveyor from the first rotational axle. The second wheel includes protrusions extending from the perimeter of the second wheel to engage segments of the conveyor belt. The instantaneous pitch of the conveyor belt at the first rotational axle is determined by measuring the relative rotational variation between the first and second rotational axles.

In a further aspect of the present disclosure, the conveyor belt is a link belt, and the first and second wheels are sprockets engaged with the links of the link belt.

In a further aspect of the present disclosure, a drive chain extends along the conveyor belt, and the first and second wheels comprise sprockets that engage with the drive chain.

In a further aspect of the present disclosure, a system for operating on food products or other workpieces includes a tool for operating on the workpiece. A conveyor for carrying and supporting the workpiece while the workpiece is being operated on includes a belt composed of sequential segments. A sensor senses an instantaneous pitch of the belt segments and the number of belt pitches passing a fixed location along the conveyor per unit time to calculate the speed of the moving conveyor, thereby to determine the location of the workpiece relative to the work tool.

In accordance with a further aspect of the present disclosure, the pitch of the conveyor belt is determined by sensing corresponding positions on the belt segments at two spaced-apart locations along the conveyor belt.

In accordance with a further aspect of the present disclosure, the conveyor belt pitch is sensed by optically sensing corresponding positions on the belt segments at spaced-apart locations along the conveyor belt.

In accordance with a further aspect of the present disclosure, a processor is used to create a synthetic encoder count based on the sensed belt pitch for use in calculating the speed of the moving conveyor and then correcting the synthetic conveyor count to be proportional to the conveyor belt distance between two spaced-apart locations along the conveyor belt.

In accordance with a further aspect of the present disclosure, a system is provided for locating a conveyance item, for instance, food, being carried on a conveyor and tracking the location of the conveyance item. The conveyor for conveying the conveyance item has repeating physical features based along the length of the conveyor. A sensor senses the instantaneous pitch between the physical features of the conveyor, as well as the number of physical features passing a fixed location along the conveyor per unit time, thereby to calculate the speed of the moving conveyor. From that information, the location of the conveyance item is determined. In accordance with a further aspect of the present disclosure, the conveyor pitch is sensed by optically sensing the physical features along the conveyor at spaced-apart locations along the conveyor.

A system for monitoring a specific location on moving conveyor belt composed of sequential belt segments includes a first wheel adapted to rotate about a first rotational axis. The first wheel includes protrusions about its circumference that engage the belt segments. A first sensor senses the angular position of the first rotational axis. A second wheel is adapted to rotate about a second rotational axis located spaced apart from the first rotational axis relative to the conveyor. The second wheel includes protrusions about its circumference that engage the belt segments. A second sensor senses the angular position of the second rotational axis. A subsystem receives the sensed angular positions of the first and second rotational axes and determines the relative rotational variation in the angular positions between the first and second rotational axes, and converts this information into the instantaneous pitch of the belt segments at the first or second rotational axis. This information is used to determine the monitored location on the conveyor.

In accordance with a further aspect of the present disclosure, a portioning system for portioning food products or other types of work products is carried on a conveyor having repeating physical features based along the length of the conveyor. A scanner scans the work product being carried by the conveyor, and a cutter is provided for cutting the work product being carried on the conveyor. A monitoring system monitors the distance that the conveyor has moved between the scanner and the cutter. The monitoring system in this regard senses the instantaneous pitch between repeating physical features of the conveyor, and the number of the physical features that pass a fixed location along the conveyor per unit time. This information is used to calculate the speed of the moving conveyor and the distance that the conveyor has moved the work product from the scanner toward the cutter.

In accordance with a further aspect of the present disclosure, the conveyor is composed of a belt composed of sequential segments. A sensor is provided for sensing the instantaneous pitch of the belt segments, and the number of belt pitches passing a fixed location along the conveyor per unit time, thereby to calculate the speed of moving conveyor. This information is used to determine the distance that the work product has moved from the scanner toward the cutter.

DETAILED DESCRIPTION

This disclosure provides systems and methods seeking to accurately determine the location of a workpiece on a conveyor belt by, among other methods, measuring the belt pitch in the vicinity of the belt drive sprockets and adjust an encoder signal from the drive sprocket appropriately to correct for the variations in belt pitch.

Figure 1:
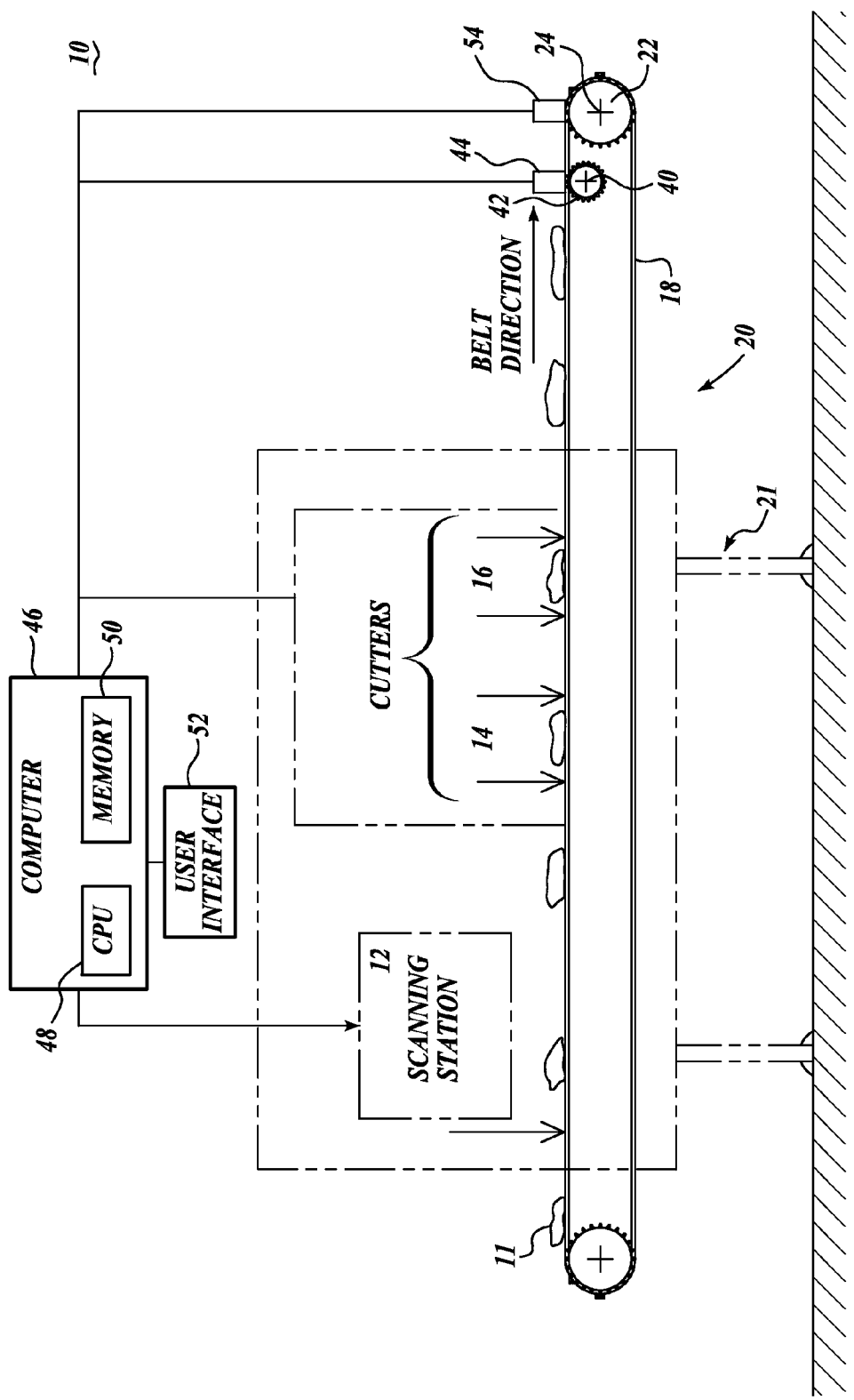
FIG. 1 is a schematic view of a work station in the form of a portioning system in accordance with the present disclosure.

FIG. 1 schematically illustrates a system 10 suitable for implementation of an embodiment of the present disclosure. The system 10 includes a conveyor 20 for carrying work products 11 to be portioned, trimmed, cut, or otherwise operated on. Although one conveyor 20 is illustrated, the system 10 may utilize more than one conveyor, for example, a loading conveyor, a processing conveyor, and an unloading conveyor. In a scanning aspect, the system 10 includes a scanner 12 for scanning the work product 11. In a portioning aspect, the system 10 includes cutters 14 and 16 for cutting the work product into one or more pieces of desired sizes, or other physical parameters. The portioning aspect of system 10 may also include a slicer (not shown), which may be interposed between the scanner and the cutters, or positioned downstream of the cutters.

The conveyor 20 and the scanner 12 are coupled to, and controlled by, a processor or computer 46 having a CPU 48 and a memory 50. The cutters 14 and 16 are shown as being coupled to the same computer 46, but may be coupled instead to a different computer (not shown). As illustrated, the computer includes an interface 52, which may be composed of one or more input device(s), e.g., in the form of a keyboard, mouse, etc., as well as one or more output device(s), e.g., in the form of a monitor, printer, etc.

The cutting conveyor 20 is constructed from a metal belt 18, supported by an underlying frame 21, and is driven by sprockets 22 mounted on a drive shaft 24. As shown in FIG. 4, the teeth 26 of the sprockets 22 engage links 34 of a chain 28 extending along the side margins of the belt 18, composed of formed, flat wire. Or, the belt can be designed without a chain 28; rather, the sprockets 22 engage the outermost links 30 of the belt 18. The belt links 30 are interconnected by metal cross rods 32 that engage through holes formed in the links 30. See FIG. 3. This type of conveyor belt drive introduces substantial variability in the speed that the cutting belt 18 is driven. With each tooth 26 of the sprocket 22 engaging and disengaging the belt 18, the speed of the belt increases and decreases because of the variation in the pitch of the flat wire belt links 30 or the chain links 34.

The computer 46 is coupled to an encoder 54 that is integrated into conveyor 20. The encoder generates signals or pulses at fixed intervals corresponding to the rotation of drive shaft 24 coupled to sprocket 22.

In the operation of system 10, the scanner 12 scans the work product 11 to produce scanning information representative of the work product and forwards the scanning information to processor/computer 46. The processor/computer 46 using a scanning product program analyzes the scanning data to determine the shape of the work product and develop a thickness profile of the scanned work product. The processor/computer also develops an area of volume distribution of the scanned work product. The processor/computer can then model the work product to determine how the work product might be divided into end product sets composed of one or more end products of specific physical criteria, including for example weight, shape, thickness, length, or width. In this regard, the computer takes into consideration the area and shape of the work products, as well as that the thickness of the work product may be altered either before or after the work product is portioned by cutters 14 and 16. In addition, the computer factors in any defects found in the work product during the scanning process, and determines how these defects may be removed via cutters 14 and 16. The computer, using the scanning program and/or the portioning program, determines how the work product may be trimmed and/or portioned into one or more end products. Using the portioning software, the computer then controls the cutters 14 and 16 to trim and/or portion the work product according to the selected end product set.

Scanner 12 can be of various types that are known in the art. Such scanners are described in U.S. Pat. No. 7,715,935, incorporated by reference herein. Also, various types of cutters 14 and 16 may be utilized to trim and cut the work product 11. Examples of cutting devices include high-speed waterjets, lasers, rotary saws, hacksaws, guillotines, and band saws. Examples of high-speed waterjet systems are disclosed by U.S. Pat. Nos. 5,365,816 and 5,868,056, incorporated by reference herein.

Encoded Sprocketed Shaft Accuracy

Figure 2:
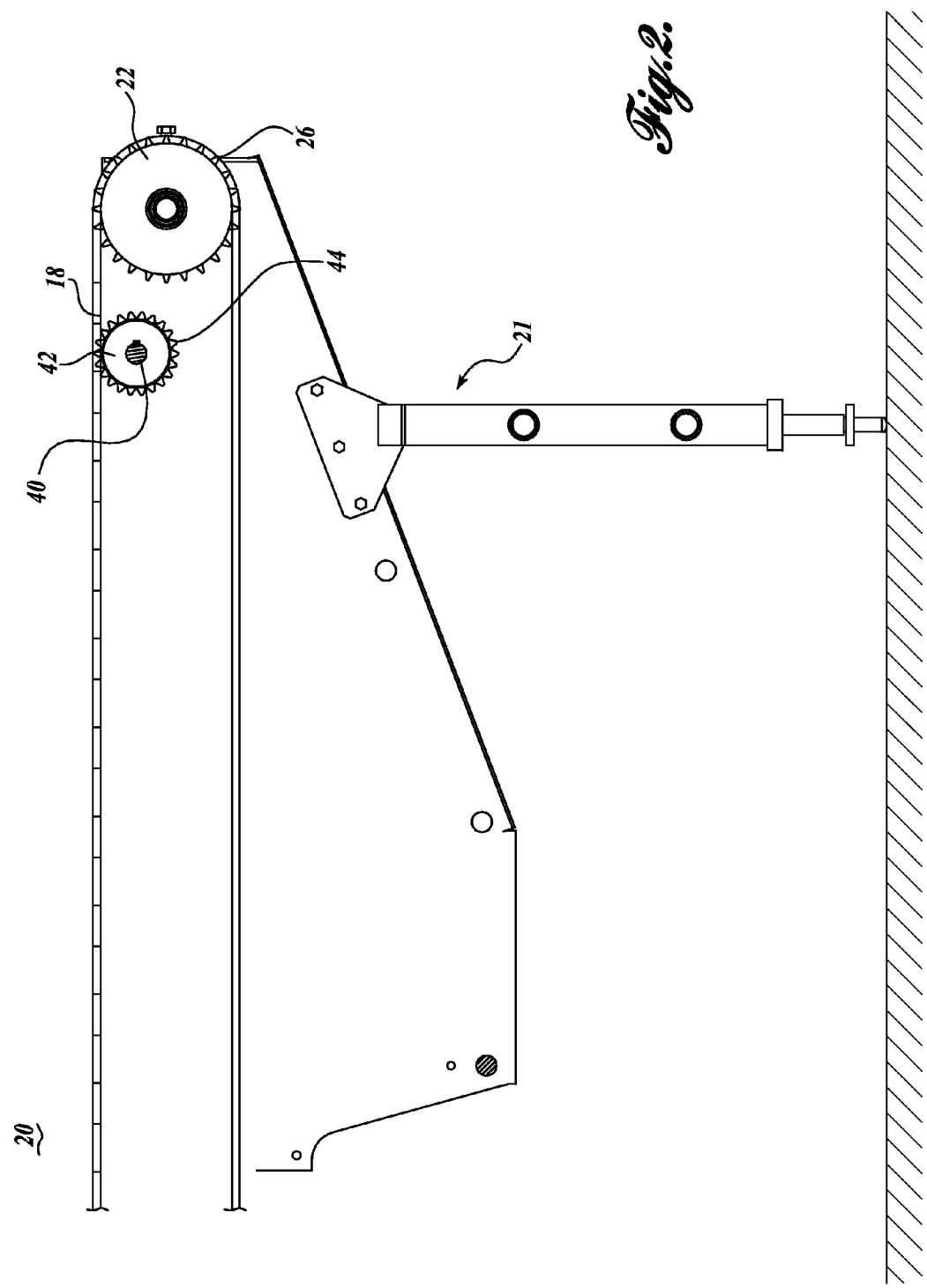
FIG. 2 is an enlarged view of the outlet end of a conveyor in accordance with the present disclosure.
Figure 3:
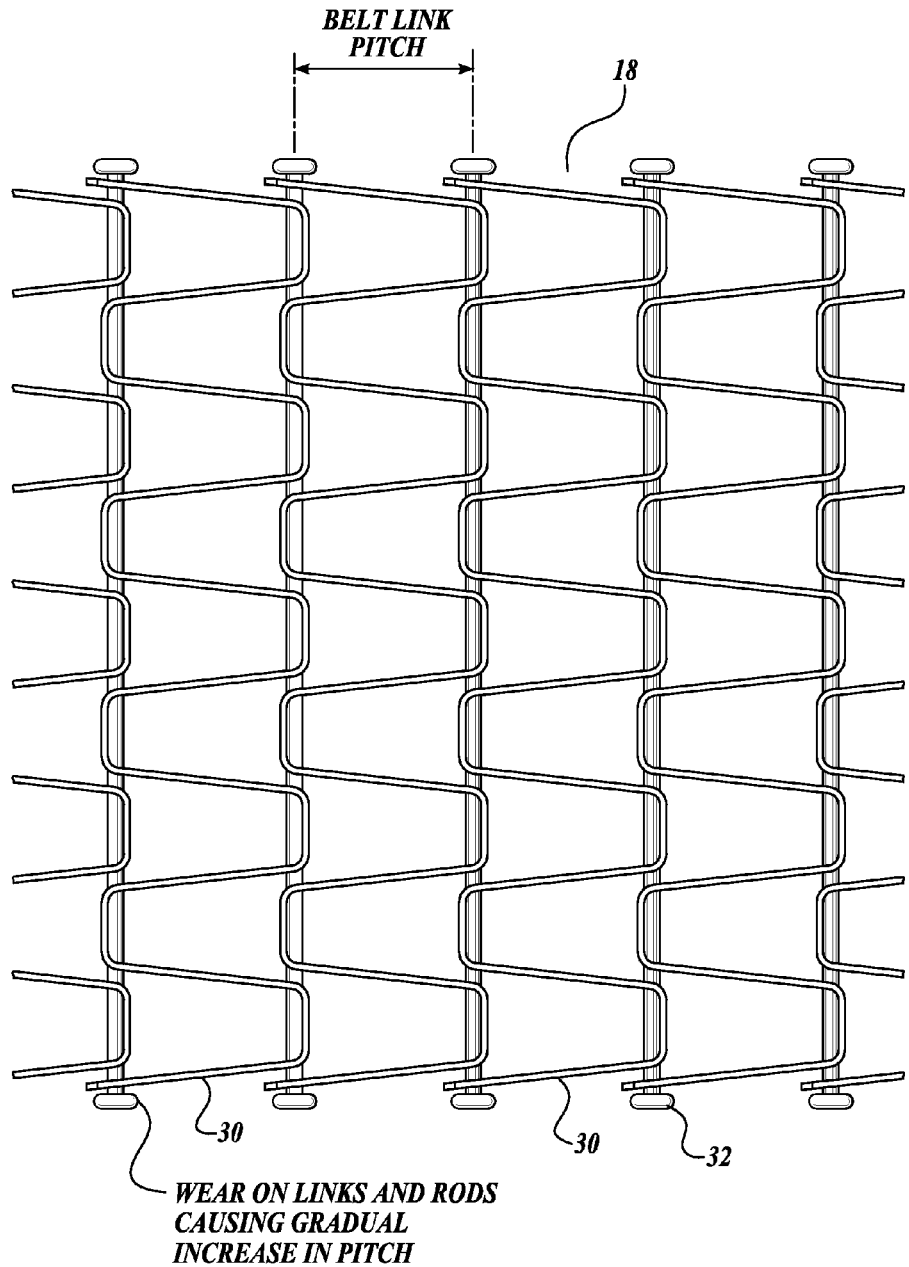
FIG. 3 is an enlarged plan view of a section of a conveyor belt.
Figure 4:
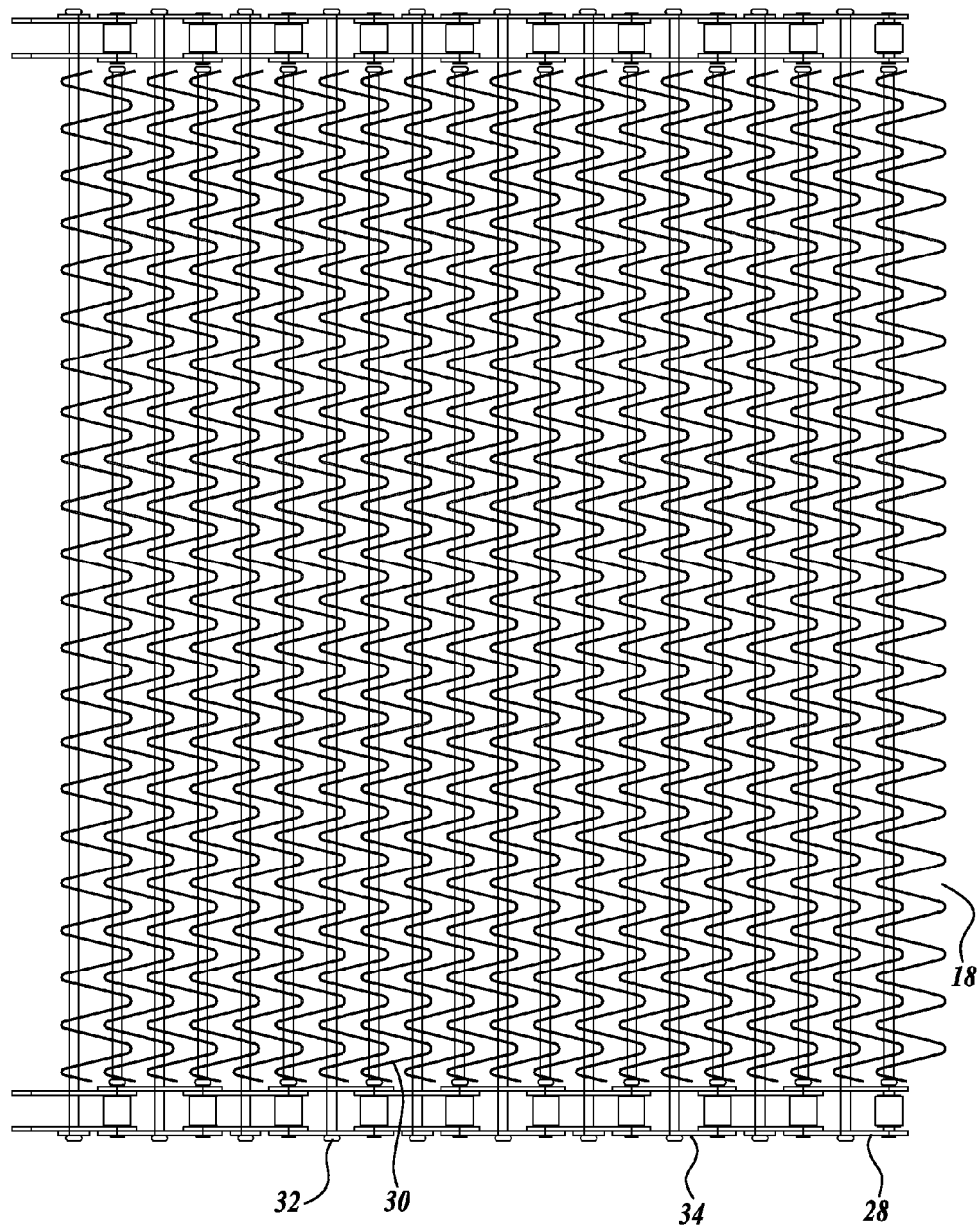
FIG. 4 is an enlarged plan view of a segment of another conveyor belt.

Wheels such as sprocket 22 shown in FIGS. 1-3, for driving a chain 28 or metal belt 18, are generally machined to shape. While the machining of the sprocket may only be fairly accurate, the aspect of a sprocket that is extremely accurate is that it has an integer number of teeth 26. That is, even if the machining operation was fairly poor, if it is good enough that the belt and sprocket can still mesh, then it is certain that the designed number of teeth 26 pass with each revolution of the sprocket 22, pulling with them the same number of links 30 in the belt 18. The number of encoder counts per revolution of the sprocket drive shaft 24, and therefore per tooth, is easy to determine by calculation on specifications or experimentally. Thus, any encoded shaft with sprockets, whether driven or idling, may be utilized by the present disclosure as a precision meter for tooth or belt link passage. As noted above, this does not mean that the distance traveled by the belt 18 is known accurately, as each link 30 will, in general, have a slightly different pitch.

Two Sprocketed Shafts

One way of measuring belt pitch in the vicinity of belt drive sprockets, such as sprockets 22, is to place a second encoded sprocketed shaft 40 of an idler sprocket 42 a short distance from the drive shaft sprocket 24. The difference between the sprocket tooth passage times of the two adjacent shafts 24 and 40 can be used to calculate the average belt pitch between the two shafts. The computer 46 is also coupled to an encoder 44 that is integrated into the conveyor 20. The second encoder generally signals or pulses at fixed intervals corresponding to the rotation of the idler shaft 40 coupled to idler sprocket 42.

Two encoded sprocket shafts 24 and 40 are located a small distance apart, for example 300 mm apart, center to center. The average belt pitch over the entire belt length (can be measured on the belt) is found to be 15 mm, so the distance between shafts is 20 links of belt 18. It is not necessary that there be an integer number of average links between the shafts.

After running the belt 18 for exactly one passage of the entire length of the belt (or many passages if the overall belt length is not known), the average phasing between tooth passages on the two shafts can be determined and set to zero with the addition of a phasing constant. If the two sprockets were identical, then the average phasing would be zero. But, since this is not likely to be the case, there will be some difference between the angle of rotation of the two shafts per sprocket tooth passage.

Subsequently, the instantaneous phasing between teeth 26 and 42 on the two shafts 24 and 40 is known from the encoder counts, measured as a fraction of one tooth pitch, for example, if at a given instant the drive shaft 24 has advanced 0.04 tooth pitches ahead of the idler shaft 40 (which is located upstream of the drive shaft). Thus, there are now 20−0.04=19.96 tooth pitches in 300 mm, so the instantaneous belt link length is known to be 300/19.96=15.03 mm. If the average pitch is 15 mm, then there are other regions of the belt 18 with a pitch below 15 mm.

The drive shaft tooth passage rate multiplied by the instantaneous belt pitch is the instantaneous belt speed. A computer-generated encoder count corresponding to the instantaneous belt speed can then drive the computations for when and where the cutters 14 and 16 need to cut workpiece 11.

It is not necessary to explicitly perform the calculations in terms of tooth passages. Tooth passage is a convenient way of describing the phasing between shafts, but actual calculations may use angles of rotation of shafts 24 and 40 or stay entirely within the encoder count realm. Also, the actual physical setup of a work station, for example, portioning system 10, will likely have different encoder resolutions for the idler shaft 40 compared to the drive shaft 24, and the sprockets 22 and 40 on the two shafts may have different numbers of teeth 26 and 42. Nonetheless, the general principles described above still apply.

Noise Issues

The encoder signal, in terms of rotation angle, is quite large compared to the difference between encoder signals for the two shafts 24 and 40. Within any one link/tooth engagement, substantial variation can occur due to exactly how the links/teeth engage, product debris in-between the links and teeth, machining errors, wear, and so on. The error within any one link/tooth engagement is insignificant compared to the product position relative to the cutters and is quickly averaged out at the next tooth or next several teeth. However, when using the present system of sensing belt pitch over a short length, these small variations can lead to a very jerky and undesirable result. Therefore, filtering can be performed to reduce the magnitude of these tooth-to-tooth variations.

One filtering technique is simply to average the tooth phasing difference (calculated by pitch value) over the distance between shafts. The longer the distance between shafts that are detecting a tooth phasing difference, the lower will be the impact of any one link variation. Of course, increasing the distance between shafts also reduces the responsiveness of the system to actual changes in belt pitch. Additional filtering could be done by averaging the calculated belt link pitch value over several adjacent belt links. More sophisticated approaches could use digital filtering techniques where frequency content over a certain threshold is ignored.

Assumptions and Calibrations

An assumed value of, or directly measured value for, the average belt pitch is used in conjunction with the method of the present disclosure. As the belt 12 wears, the average pitch will increase (for example, by up to 1%), and the operator may not input new values. However, there are certain calibration procedures on typical portioning machines which are performed routinely that reduce the concern about making the assumptions. A small error in average belt pitch results in a small error in belt velocity. The main consequences of a small error in velocity are that the scanned volume will be off in proportion to the velocity error, the position of the cutters will be off in proportion to the velocity error times the scan to cut distance, and the cut shapes produced by the cutters will be off in length in proportion to the velocity error.

Due to the size and fabrication methods of automatic portioners, it is desirable to calibrate the distance from the scanner to the first cutter, the distance from the first cutter to the second cutter, the distance from the second cutter to the third cutter, etc., on a frequent basis; generally, weekly. Due to variations in actual work product density, for example chicken, variations in translucence of the chicken and, therefore, apparent thickness perceived by the scanner, etc., it is desirable to calibrate the density of the cut chicken by inputting a value of density that achieves the desired cut weight. This procedure is generally done on a daily basis.

The frequent calibration of scan-to-cut and cut-to-cut distances helps compensate for the error in product position caused by an incorrect average pitch assumption. The frequent calibration for density compensates for the slight error in scanned volume caused by an incorrect average pitch assumption and for the slight error in cut volume, as well. These compensations are very reasonable for the small variations from a mid-life value of about 0.5% change in pitch.

Synthetic Encoder Signal/Speed Control

One architecture of automatic portioner control, uses the belt encoder signal rather than a time signal to drive most other processes, such as cutter/slicer position. In this case, it is desirable to generate a synthetic encoder signal in the control computer or other processor which varies in time spacing in order to compensate for the variations in belt velocity. This synthetic encoder signal can either be generated from scratch or it can be a correction to the signal from one of the encoded sprocketed shafts.

Another possible architecture of automatic portioner control uses a time signal rather than a belt encoder signal to drive most other processes, such as cutter position. In this case, it is desirable to use the information on belt pitch variation to cause the drive motor controller to change the drive motor speed continuously to maintain a steady belt speed.

Other combinations are possible, such as generating a steady synthetic encoder count and correcting the motor speed to achieve a steady belt speed. Also, other approaches to belt and machine control where the belt speed is assumed to be constant or a sloping value until it is redefined to a different constant or sloping value could be used instead of the encoder signal approach (comparable to the difference between pixel and vector image representations). In this case, the velocity would be corrected according to the instantaneous belt pitch.

Start-Up Methods

When the portioning machine is turned on, for example at the beginning of the day (assuming all calibrations and inputs have been made previously), there is no instant knowledge of where on the belt 18 the sprocketed shafts 24 and 40 are located, such as in an area of below-average belt pitch or above-average belt pitch. An initial assumption of the phasing constant is made so the machine can run and begin the pitch correction process. A reasonable starting guess for the initial value of phasing constant is chosen to make the teeth initially in phase (equal to negative of the initial phase difference). As the belt 18 runs, the estimated average value of phasing becomes more and more accurate, with the phasing constant being updated to make the average value in phase. Within a few laps of the belt 18, the phasing constant becomes steady, and the belt pitch sensing system accurately determines the belt speed.

A way of "starting faster" is to record, from previous running, where the mean tooth phasing is as a percentage of the range of tooth phasing up from the minimum tooth phasing. The minimum and maximum tooth phasing will be encountered in no more than one lap of the belt 18. The assumed mean phasing is then calculated from the minimum and maximum that have been encountered so far in the run. This approach adds the complication that values need to be identified, stored, and periodically updated, but reduces the time to achieve accurate belt link pitch correction.

Scope of Disclosure

The present disclosure is described in terms of cutters or slicers in an automatic portioner, especially a portioner for food products. The present method and techniques could be used to control work tools, equipment and processors other than cutters or slicers, in other machines, or apparatus where position control from two separate processes (such as scan and cut) are far enough apart to accumulate belt pitch errors. Such other work tools, equipment and processors in the food processing arena can include, for example, batterers, breaders, fryers, freezers, cookers, ovens, flatteners, de-veiners, de-scalers, etc. Thus, wherever the word cutter or slicer has been used, a more generic term of "work tool" can equally apply.

Also, the present disclosure can be applied to many areas outside of food processing. Some examples include work tools used in printing, painting, injection filling, machining operations (for example, drilling, milling, or broaching), welding, or numerous other operations. The present disclosure can also be applied to robotic operations on a workpiece or when unloading a workpiece from a conveyor, whether by robotic device or other means. Also, any belt, whether driven by sprockets or other means, and whether composed of metal, plastic, elastomer, or even a tractor drive for paper, can make use of the present disclosure.

The foregoing disclosure discusses using two sprocketed encoded shafts 24 and 40 for sensing belt pitch, one of which (24) is driven, and the other of which (40) is an idler. Alternatively, two idler shafts or two driven shafts could be used instead. Also, the location of the two sprocketed encoded shafts does not need to be at the end roller at the outfeed end of the conveyor 20. The two shafts can be almost anywhere along the conveyor 20, although they need to be fairly close together, and there cannot be a take-up mechanism between the two shafts or between the shafts and the scan or cut stations. The two shafts can be located prior to the scan 12 and cut stations 14, 16 or even among or between the stations.

Further, either sprocket 22 or 40 can engage the belt 18 either tangentially or with the belt 18 wrapped around it, or the sprocket can be either above or below the belt. The shafts and sprockets can also be in another axis, such as engaging the edge of the belt 18 rather than the bottom or top of the belt. Also, the sprockets may be in the form of other rotational devices that engage the belt 18, such as wheels, disks, spoked rims, etc. Also, the engagement with this belt can be by teeth, protrusions, projections spaced apart along the perimeter or circumference of such wheels, disks, rims, and can project or extend radially, transversely, or at an angle therebetween, relative to the wheels, disk, rim, etc.

Figure 5:
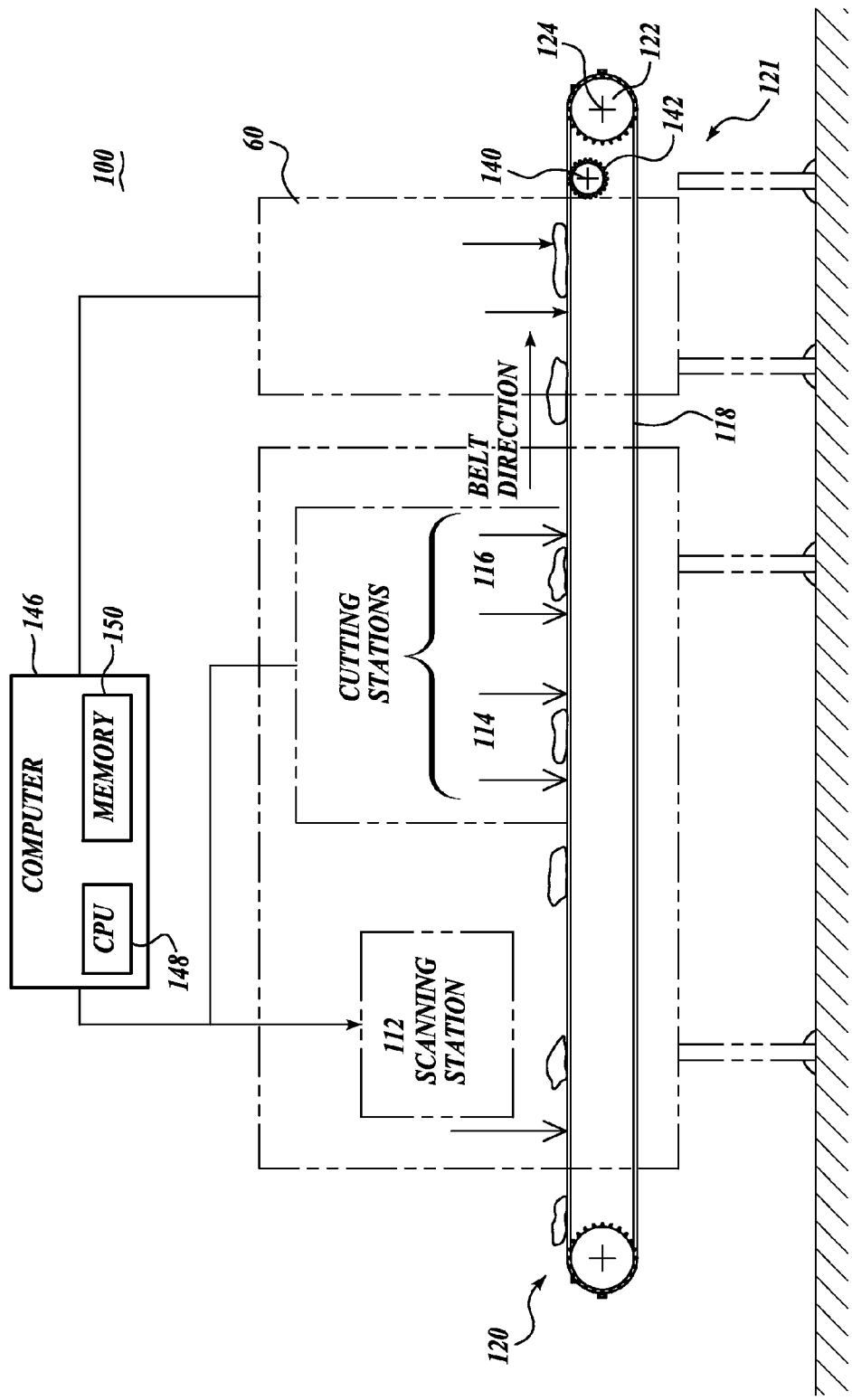
FIG. 5 is a schematic view of another embodiment of the present disclosure.

The shaft encoding devices can be of many different types and can even be in the form of position feedback from a motor controller. Further, as shown in FIG. 5, in determining instantaneous belt speed, the use of one or both of the sprockets 122 and 142 and associated encoders can be replaced by using one or more scanners 60 or other optical or proximity sensing devices that senses the location and passage of belt link 30, cross rods 32, or other alternative feature(s) or aspect(s) of the conveyor belt 118 or other location(s) on the conveyer belt 118. Such features or aspects can have been purposefully designed into the belt for use as markers in conjunction with the present system and method, or such physical features could have been designed into the belt for other functional reasons or for structural reasons. In this regard, the type of belt(s) used with scanners or optical or proximity sensors need not be a typical wire mesh or link belt, but can be of virtually any construction, including flat belts, plastic belts, belts constructed from multiple layers of different materials, multiple layer belts reinforced with high tensile strength materials or other types of materials, etc. The scanner or optical or proximity sensors, can be at a location separate from portioner 10, as shown in FIG. 5. Alternatively, the scanning of the belt can be carried out using the same scanning station 12, as used for initially ascertaining physical characteristics of the workpiece, see FIG. 1.

Automatic portioners and other processing or production systems often use two sequential belts with a smooth transfer from the first belt to the second belt. The first belt is for loading and scanning and may have properties such as a smooth surface. The second belt, such as belt 18 described above, is for cutting or other operation and unloading, and needs to be of sufficient structural integrity to survive the operations of the work tool, for example, the cutting action by high pressure waterjet cutters. Thus, the second belt 18 is typically in the form of a sprocketed, metal link belt of the type disclosed above. The first belt can be driven by a friction drive system and is therefore very accurate in its motion. The second belt, which also typically represents most of the distance from scanning to cutting, can benefit greatly from the methods and techniques of the present disclosure. In this situation, where the disclosure description language above is from "scanning to cutting," it would change to from "transfer point to cutting" or "transfer point to work piece operation."

Moreover, although the present disclosure can be advantageously used in modern, high precision conveyor systems, the present disclosure can also be advantageously utilized in older or less precise conveyors, especially conveyors consisting of sequential links, whether or not having an associated drive chain, driven by sprockets or similar driving mechanism. Typically such conveyors will be inherently inaccurate if a single encoder is used with the drive shaft in an effort to determine belt speed. This may be especially true in situations where the belt is subject to rapid deterioration and must be replaced quite often; for example, when used to convey work products that are cut using high speed water jets.

In general, the system and methods of the present disclosure can be useful to accurately locate a product or workpiece on a conveyor belt or similar conveyance device or system, or to keep track of a particular belt or conveyance device segment or a specific location along a moving conveyor belt or conveyance device.

It can also be appreciated that the system and methods of the present disclosure can be useful in the scanning or inspection of all types of food products, as well as all types of manufactured products, whether electronics, packages, mechanical parts, etc. In this regard, use of the present system and methods can benefit from having more accurate encoder or location information regarding the work product, more particularly wherealong the work product the scanner image is actually occurring. In one simple example, the present system and method can be utilized advantageously to accurately measure a relatively long product or accurately know where a specific feature that has been scanned exists along the length of the product. In this regard, a scan of the product could be taken every fixed distance along the conveyor belt carrying the work product, as opposed to taking the scan at a fixed interval of time, which is typically the case.

While exemplary embodiments of the disclosure have been illustrated and described, it will be appreciated that various changes can be made therein without departing from the spirit and scope of the invention.

The embodiments of the invention in which an exclusive property or privilege is claimed are defined as follows:

1. A system for operating on a food product, comprising:
   (a) a work tool for operating on a food product;
   (b) a conveyor for carrying and supporting the food product while the food product is being operated, the conveyor comprising a belt composed of sequential segments;
   (c) a scanner for scanning the food product to determine the location that the food product is positioned on the conveyor;
   (d) a sensor for sensing the instantaneous pitch of the belt segments and for sensing the number of belt pitches passing a fixed location along the conveyor per unit of time; and
   (e) a processor using the information from the scanner and sensor to calculate the speed of the moving conveyor, thereby to determine the location of the food product relative to the work tool.

2. The system according to claim 1, wherein the belt pitch is determined by sensing corresponding positions on the belt segments at two spaced-apart locations along the conveyor belt.

3. The system according to claim 2, wherein the conveyor belt comprises sequential belt links connected together by connecting rods, and the sensor sensing the positions of the connecting rods.

4. The system according to claim 1, wherein the belt pitch is sensed by optically sensing corresponding positions on the belt segments at spaced-apart locations along the conveyor belt.

5. The system according to claim 4, wherein the belt comprises sequential belt links connected together by cross rods, and the sensor sensing corresponding positions of the belt links.

6. The system according to claim 1, wherein the sensor comprises an optical sensor, the optical sensor configured to sense sequential locations on the conveyor belt.

7. The system according to claim 1, further comprising a processor for creating a synthetic encoder count based on the sensed belt pitch for use in calculating the speed of the moving conveyor, and then correcting the synthetic encoder count to be proportional to the conveyor belt distance between two spaced-apart locations along the conveyor belt.

8. A system for locating a food item on a conveyor and tracking the location of the food item, comprising:
 (a) a conveyor for conveying a food item, the conveyor having a repeating physical feature spaced along the length of the conveyor; and
 (b) a scanner for scanning the food item to determine the location that the food item is positioned on the conveyor;
 (c) a sensor for sensing the instantaneous pitch between the physical features and for sensing the number of the physical features passing a fixed location along the conveyor per unit time; and
 (d) a processor for utilizing the information from the scanner and the information from the sensor to calculate the speed of the moving conveyor, thereby to determine the location of the food item.

9. The system according to claim 8, wherein the conveyor pitch is determined by sensing the physical features along the conveyor at two spaced-apart locations along the conveyor.

10. The system according to claim 8, wherein the conveyor pitch is sensed by optically sensing the physical features along the conveyor at spaced-apart locations along the conveyor.

11. The system according to claim 8, further comprising a processor for creating a synthetic encoder count based on the sensed pitch of the conveyor for use in calculating the speed of the moving conveyor, and then correcting the synthetic encoder count to be proportional to the distance between two spaced-apart locations along the conveyor.

12. The system according to claim 1, further comprising:
 a first wheel mounted on a rotational axle shaft, the first wheel comprising protrusions extending from the perimeter of the wheel to engage the belt segments;
 a second wheel mounted on a second rotational axis, the second rotational axis spaced from the first rotational axis, the second wheel comprising protrusions extending from the perimeter of the second wheel to engage the segments of the belt; and
 wherein the instantaneous pitch of the belt at the first rotational axis is determined by measuring the relative rotational variation between the first and second rotational axes, resulting from rotation of the first and second rotational axes by movement of the conveyor belt.

* * * * *